(12) United States Patent
Tiwari

(10) Patent No.: US 10,380,249 B2
(45) Date of Patent: Aug. 13, 2019

(54) PREDICTING FUTURE TRENDING TOPICS

(71) Applicant: Facebook, Inc., Menlo Park, CA (US)

(72) Inventor: Parth Tiwari, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/723,095

(22) Filed: Oct. 2, 2017

(65) Prior Publication Data
US 2019/0102374 A1    Apr. 4, 2019

(51) Int. Cl.
*G06F 16/487* (2019.01)
*G06F 17/27* (2006.01)
*G06Q 50/00* (2012.01)
*G06K 9/62* (2006.01)

(52) U.S. Cl.
CPC ........ *G06F 17/277* (2013.01); *G06F 17/2785* (2013.01); *G06K 9/6267* (2013.01); *G06Q 50/01* (2013.01)

(58) Field of Classification Search
CPC ...... G06F 16/487; G06F 16/489; G06F 17/27; G06F 17/2705; G06F 17/277; G06F 17/279; G06Q 30/0201; G06Q 30/0202; G06Q 50/01
USPC ................. 704/1, 9; 707/724, 725, 727, 750
See application file for complete search history.

(56) References Cited

U.S. PATENT DOCUMENTS

| | | |
|---|---|---|
| 5,293,581 A | 3/1994 | DiMarco |
| 5,477,451 A | 12/1995 | Brown et al. |
| 5,510,981 A | 4/1996 | Berger et al. |
| 5,799,193 A | 8/1998 | Sherman et al. |
| 5,991,710 A | 11/1999 | Papineni et al. |
| 6,002,998 A | 12/1999 | Martino et al. |
| 6,157,905 A | 12/2000 | Powell |
| 6,161,082 A | 12/2000 | Goldberg et al. |
| 6,223,150 B1 | 4/2001 | Duan et al. |
| 6,266,642 B1 | 7/2001 | Franz et al. |
| 6,304,841 B1 | 10/2001 | Berger et al. |
| 6,377,925 B1 | 4/2002 | Greene et al. |
| 6,393,389 B1 | 5/2002 | Chanod et al. |

(Continued)

OTHER PUBLICATIONS

Corrected Notice of Allowability dated Jul. 13, 2017, for U.S. Appl. No. 14/973,387 of Rottmann, K., et al., filed Dec. 17, 2015.

(Continued)

*Primary Examiner* — Martin Lerner
(74) *Attorney, Agent, or Firm* — Fenwick & West LLP

(57) ABSTRACT

A prediction system can predict future trending topics. The prediction system can classify social media posts by region and vertical, extract text from the posts, tokenize the extracted text, and organizing the tokens into n-grams. The prediction system can store the n-grams from the posts in a cumulative set of n-grams, with each n-gram tagged with the originating post's identified region, vertical, and a time value. The prediction system can compute, for each n-gram, a frequency within each category defined by a region/vertical pair. The prediction system can fit occurrence data for n-grams to a polynomial and identify the slope of the point on for the current time. The slope can be used as a prediction of growth or decline for the n-gram. The prediction system can identify n-grams with a comparatively large slope within that region/vertical as likely to be trending in the future.

18 Claims, 7 Drawing Sheets

(56) References Cited

U.S. PATENT DOCUMENTS

| | | | |
|---|---|---|---|
| 6,629,095 B1 | 9/2003 | Wagstaff et al. | |
| 7,054,804 B2 | 5/2006 | Gonzales et al. | |
| 7,110,938 B1 | 9/2006 | Cheng et al. | |
| 7,359,861 B2 | 4/2008 | Lee | |
| 7,533,019 B1 | 5/2009 | Hakkani-Tur et al. | |
| 7,664,629 B2 | 2/2010 | Dymetman et al. | |
| 7,813,918 B2 | 10/2010 | Muslea et al. | |
| 7,818,224 B2* | 10/2010 | Boerner | G06F 17/18 705/35 |
| 7,827,026 B2 | 11/2010 | Brun et al. | |
| 7,895,030 B2 | 2/2011 | Al-Onaizan et al. | |
| 7,983,903 B2 | 7/2011 | Gao | |
| 8,015,140 B2 | 9/2011 | Kumar et al. | |
| 8,145,484 B2 | 3/2012 | Zweig | |
| 8,175,244 B1 | 5/2012 | Frankel | |
| 8,204,739 B2 | 6/2012 | Waibel et al. | |
| 8,209,333 B2 | 6/2012 | Hubbard et al. | |
| 8,265,923 B2 | 9/2012 | Chatterjee et al. | |
| 8,275,602 B2 | 9/2012 | Curry et al. | |
| 8,386,235 B2 | 2/2013 | Duan et al. | |
| 8,543,580 B2 | 9/2013 | Chen et al. | |
| 8,756,050 B1 | 6/2014 | Harkness et al. | |
| 8,825,466 B1 | 9/2014 | Wang et al. | |
| 8,825,759 B1 | 9/2014 | Jackson et al. | |
| 8,831,928 B2 | 9/2014 | Marcu et al. | |
| 8,838,434 B1 | 9/2014 | Liu | |
| 8,874,429 B1 | 10/2014 | Crosley | |
| 8,897,423 B2 | 11/2014 | Nanjundaswamy | |
| 8,935,150 B2 | 1/2015 | Christ | |
| 8,942,973 B2 | 1/2015 | Viswanathan | |
| 8,949,865 B1 | 2/2015 | Murugesan et al. | |
| 8,983,974 B1 | 3/2015 | Jackson et al. | |
| 8,990,068 B2 | 3/2015 | Orsini et al. | |
| 8,996,352 B2 | 3/2015 | Orsini et al. | |
| 8,996,353 B2 | 3/2015 | Orsini et al. | |
| 8,996,355 B2 | 3/2015 | Orsini et al. | |
| 9,009,025 B1 | 4/2015 | Porter | |
| 9,031,829 B2 | 5/2015 | Leydon et al. | |
| 9,104,661 B1 | 8/2015 | Evans | |
| 9,111,218 B1* | 8/2015 | Lewis | G06F 16/35 |
| 9,183,309 B2 | 11/2015 | Gupta | |
| 9,231,898 B2 | 1/2016 | Orsini et al. | |
| 9,235,565 B2* | 1/2016 | Tseng | G06F 17/273 |
| 9,245,278 B2 | 1/2016 | Orsini et al. | |
| 9,336,206 B1 | 5/2016 | Orsini et al. | |
| 9,477,652 B2 | 10/2016 | Huang | |
| 9,734,142 B2 | 8/2017 | Huang | |
| 9,734,143 B2 | 8/2017 | Rottmann et al. | |
| 9,740,687 B2 | 8/2017 | Herdagdelen et al. | |
| 9,747,283 B2 | 8/2017 | Rottmann et al. | |
| 9,805,029 B2 | 10/2017 | Rottmann et al. | |
| 9,830,386 B2* | 11/2017 | Huang | G06F 17/2785 |
| 9,830,404 B2 | 11/2017 | Huang et al. | |
| 10,095,686 B2* | 10/2018 | Zhang | G06F 17/2765 |
| 2002/0087301 A1 | 7/2002 | Jones et al. | |
| 2002/0161579 A1 | 10/2002 | Saindon et al. | |
| 2002/0169592 A1 | 11/2002 | Aityan | |
| 2003/0040900 A1 | 2/2003 | D'Agostini et al. | |
| 2004/0002848 A1 | 1/2004 | Zhou et al. | |
| 2004/0049374 A1 | 3/2004 | Breslau et al. | |
| 2004/0098247 A1 | 5/2004 | Moore | |
| 2004/0122656 A1 | 6/2004 | Abir | |
| 2004/0243392 A1 | 12/2004 | Chino et al. | |
| 2005/0021323 A1 | 1/2005 | Li | |
| 2005/0039742 A1* | 2/2005 | Hickle | G06F 19/3418 128/203.14 |
| 2005/0055630 A1 | 3/2005 | Scanlan et al. | |
| 2005/0228640 A1 | 10/2005 | Aue et al. | |
| 2006/0111891 A1 | 5/2006 | Menezes et al. | |
| 2006/0206798 A1 | 9/2006 | Kohlmeier et al. | |
| 2006/0271352 A1 | 11/2006 | Nikitin et al. | |
| 2007/0130563 A1 | 6/2007 | Elgazzar et al. | |
| 2007/0136222 A1 | 6/2007 | Horvitz | |
| 2008/0046231 A1 | 2/2008 | Laden et al. | |
| 2008/0077384 A1 | 3/2008 | Agapi et al. | |
| 2008/0281578 A1 | 11/2008 | Kumaran et al. | |
| 2009/0070095 A1 | 3/2009 | Gao et al. | |
| 2009/0083023 A1 | 3/2009 | Foster et al. | |
| 2009/0132233 A1 | 5/2009 | Etzioni et al. | |
| 2009/0182547 A1 | 7/2009 | Niu et al. | |
| 2009/0198487 A1 | 8/2009 | Wong et al. | |
| 2009/0210214 A1 | 8/2009 | Qian et al. | |
| 2009/0248661 A1* | 10/2009 | Bilenko | G06F 16/951 |
| 2009/0276206 A1 | 11/2009 | Fitzpatrick et al. | |
| 2009/0281789 A1 | 11/2009 | Waibel et al. | |
| 2009/0326912 A1 | 12/2009 | Ueffing | |
| 2010/0042928 A1 | 2/2010 | Rinearson et al. | |
| 2010/0121639 A1 | 5/2010 | Zweig | |
| 2010/0161642 A1 | 6/2010 | Chen et al. | |
| 2010/0179803 A1 | 7/2010 | Sawaf et al. | |
| 2010/0194979 A1 | 8/2010 | Blumenschein et al. | |
| 2010/0223048 A1 | 9/2010 | Lauder | |
| 2010/0228777 A1 | 9/2010 | Imig et al. | |
| 2010/0241416 A1 | 9/2010 | Jiang et al. | |
| 2010/0283829 A1 | 11/2010 | De Beer et al. | |
| 2010/0299132 A1 | 11/2010 | Dolan et al. | |
| 2011/0099000 A1 | 4/2011 | Rai et al. | |
| 2011/0137636 A1 | 6/2011 | Srihari et al. | |
| 2011/0246172 A1 | 10/2011 | Liberman et al. | |
| 2011/0246881 A1 | 10/2011 | Kushman et al. | |
| 2011/0252027 A1 | 10/2011 | Chen et al. | |
| 2011/0282648 A1 | 11/2011 | Sarikaya et al. | |
| 2012/0005224 A1 | 1/2012 | Ahrens et al. | |
| 2012/0029910 A1 | 2/2012 | Medlock et al. | |
| 2012/0035907 A1 | 2/2012 | Lebeau et al. | |
| 2012/0035915 A1 | 2/2012 | Kitade et al. | |
| 2012/0047172 A1 | 2/2012 | Ponte et al. | |
| 2012/0059653 A1 | 3/2012 | Adams et al. | |
| 2012/0101804 A1 | 4/2012 | Roth et al. | |
| 2012/0109649 A1 | 5/2012 | Talwar et al. | |
| 2012/0123765 A1 | 5/2012 | Estelle et al. | |
| 2012/0130940 A1 | 5/2012 | Gattani et al. | |
| 2012/0138211 A1 | 6/2012 | Barger et al. | |
| 2012/0158621 A1 | 6/2012 | Bennett et al. | |
| 2012/0173224 A1 | 7/2012 | Anisimovich et al. | |
| 2012/0209588 A1 | 8/2012 | Wu | |
| 2012/0253785 A1 | 10/2012 | Hamid et al. | |
| 2012/0330643 A1 | 12/2012 | Frei et al. | |
| 2013/0018650 A1 | 1/2013 | Moore et al. | |
| 2013/0060769 A1 | 3/2013 | Pereg et al. | |
| 2013/0084976 A1 | 4/2013 | Kumaran et al. | |
| 2013/0103384 A1 | 4/2013 | Hunter et al. | |
| 2013/0144595 A1 | 6/2013 | Lord et al. | |
| 2013/0144603 A1 | 6/2013 | Lord et al. | |
| 2013/0144619 A1 | 6/2013 | Lord et al. | |
| 2013/0173247 A1 | 7/2013 | Hodson et al. | |
| 2013/0211824 A1* | 8/2013 | Tseng | G06F 17/273 704/10 |
| 2013/0246063 A1 | 9/2013 | Teller | |
| 2013/0246432 A1* | 9/2013 | Paskin | G06F 16/9535 707/740 |
| 2013/0317808 A1 | 11/2013 | Kruel et al. | |
| 2014/0006003 A1 | 1/2014 | Soricut et al. | |
| 2014/0006929 A1 | 1/2014 | Swartz et al. | |
| 2014/0012568 A1 | 1/2014 | Caskey et al. | |
| 2014/0025734 A1 | 1/2014 | Griffin et al. | |
| 2014/0059030 A1 | 2/2014 | Hakkani-Tur et al. | |
| 2014/0081619 A1 | 3/2014 | Solntseva et al. | |
| 2014/0108393 A1 | 4/2014 | Angwin | |
| 2014/0163977 A1 | 6/2014 | Hoffmeister et al. | |
| 2014/0172413 A1 | 6/2014 | Cvijetic et al. | |
| 2014/0195884 A1 | 7/2014 | Castelli et al. | |
| 2014/0207439 A1 | 7/2014 | Venkatapathy et al. | |
| 2014/0229155 A1 | 8/2014 | Leydon et al. | |
| 2014/0279996 A1 | 9/2014 | Teevan et al. | |
| 2014/0280295 A1 | 9/2014 | Kurochkin et al. | |
| 2014/0280592 A1 | 9/2014 | Zafarani et al. | |
| 2014/0288913 A1 | 9/2014 | Shen et al. | |
| 2014/0288917 A1 | 9/2014 | Orsini et al. | |
| 2014/0288918 A1 | 9/2014 | Orsini et al. | |
| 2014/0303960 A1 | 10/2014 | Orsini et al. | |
| 2014/0335483 A1 | 11/2014 | Buryak et al. | |
| 2014/0337007 A1 | 11/2014 | Waibel et al. | |
| 2014/0337989 A1 | 11/2014 | Orsini et al. | |

(56) References Cited

U.S. PATENT DOCUMENTS

| | | |
|---|---|---|
| 2014/0350916 A1 | 11/2014 | Swerdlow et al. |
| 2014/0358519 A1 | 12/2014 | Mirkin et al. |
| 2014/0365200 A1 | 12/2014 | Sagie |
| 2014/0365460 A1 | 12/2014 | Portnoy et al. |
| 2015/0006143 A1 | 1/2015 | Skiba et al. |
| 2015/0006219 A1 | 1/2015 | Jose et al. |
| 2015/0033116 A1 | 1/2015 | McKinney et al. |
| 2015/0046146 A1 | 2/2015 | Crosley |
| 2015/0052087 A1* | 2/2015 | Srinivasan ............. G06N 20/00 706/12 |
| 2015/0066805 A1 | 3/2015 | Candee et al. |
| 2015/0120290 A1 | 4/2015 | Shagalov |
| 2015/0134322 A1 | 5/2015 | Cuthbert et al. |
| 2015/0142420 A1 | 5/2015 | Sarikaya et al. |
| 2015/0142510 A1* | 5/2015 | Bodden ............... G06Q 30/0201 705/7.29 |
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Cuthbert et al. |
| 2015/0161227 A1 | 6/2015 | Buryak et al. |
| 2015/0213008 A1 | 7/2015 | Orsini et al. |
| 2015/0228279 A1 | 8/2015 | Biadsy et al. |
| 2015/0293997 A1 | 10/2015 | Smith et al. |
| 2015/0356571 A1* | 12/2015 | Chang ................. G06Q 30/0201 705/7.29 |
| 2015/0363388 A1 | 12/2015 | Herdagdelen et al. |
| 2016/0041986 A1 | 2/2016 | Nguyen |
| 2016/0048505 A1 | 2/2016 | Cuthbert et al. |
| 2016/0092603 A1 | 3/2016 | Rezaei et al. |
| 2016/0092793 A1* | 3/2016 | Garrow ............... G06F 17/2755 706/12 |
| 2016/0117628 A1 | 4/2016 | Brophy et al. |
| 2016/0162473 A1 | 6/2016 | Cogley et al. |
| 2016/0162477 A1 | 6/2016 | Orsini et al. |
| 2016/0162478 A1 | 6/2016 | Blassin et al. |
| 2016/0162575 A1 | 6/2016 | Eck et al. |
| 2016/0188575 A1 | 6/2016 | Sawaf |
| 2016/0188576 A1 | 6/2016 | Huang |
| 2016/0188661 A1 | 6/2016 | Zhang et al. |
| 2016/0188703 A1 | 6/2016 | Zhang et al. |
| 2016/0217124 A1 | 7/2016 | Sarikaya et al. |
| 2016/0239476 A1 | 8/2016 | Huang |
| 2016/0267073 A1 | 9/2016 | Baghat et al. |
| 2016/0299884 A1 | 10/2016 | Chioasca et al. |
| 2016/0314191 A1* | 10/2016 | Markman ........... G06F 17/2755 |
| 2016/0357519 A1 | 12/2016 | Vargas |
| 2016/0379283 A1* | 12/2016 | Balasubramanian ........................ G06Q 30/0603 705/26.4 |
| 2017/0011739 A1 | 1/2017 | Huang |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann |
| 2017/0185588 A1 | 6/2017 | Rottmann et al. |
| 2017/0270102 A1 | 9/2017 | Herdagdelen et al. |
| 2017/0286978 A1* | 10/2017 | Govindarajan .... G06Q 30/0202 |
| 2017/0315988 A1 | 11/2017 | Herdagdelen et al. |
| 2017/0315991 A1 | 11/2017 | Rottmann et al. |
| 2018/0032886 A1* | 2/2018 | Danson ............... G06F 17/2765 |
| 2018/0034931 A1* | 2/2018 | Chakra ............... G06F 12/0813 |
| 2018/0293306 A1* | 10/2018 | Park ..................... G06F 16/345 |

OTHER PUBLICATIONS

Extended European Search Report for European Application No. 16161095.1, dated Feb. 16, 2017, 4 pages.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Final Office Action dated Jul. 1, 2016, for U.S. Appl. No. 14/302,032 of Herdagdelen, A., filed Jun. 11, 2014.
Final Office Action dated Jun. 16, 2017, for U.S. Appl. No. 14/586,022 of Huang, F. et al., filed Dec. 30, 2014.
Final Office Action dated Sep. 8, 2017 for U.S. Appl. No. 15/445,978 of Herdagdelen, A. filed Feb. 28, 2017.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Non-Final Office Action dated Dec. 17, 2015, for U.S. Appl. No. 14/302,032 of Saint Cyr, L., filed Jun. 11, 2014.
Non-Final Office Action dated Dec. 21, 2016, for U.S. Appl. No. 14/586,022 of Huang, F., filed Dec. 30, 2014.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Jul. 28, 2016, for U.S. Appl. No. 14/861,747 of F. Huang, filed Sep. 22, 2015.
Non-Final Office Action dated Jun. 26, 2017 for U.S. Appl. No. 15/445,978 of Amac Herdagdelen, filed Feb. 28, 2017.
Non-Final Office Action dated Mar. 10, 2016, for U.S. Appl. No. 14/621,921 of Huang, F., filed Feb. 13, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
Notice of Allowability dated Sep. 12, 2017 for U.S. Appl. No. 14/981,794 by Rottmann, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017, for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
Notice of Allowance dated Jul. 12, 2017, for U.S. Appl. No. 14/981,794 by Rottman, K., et al., filed Dec. 28, 2015.
Notice of Allowance dated Jul. 18, 2016, for U.S. Appl. No. 14/621,921 of Huang, F., filed Feb. 13, 2015.
Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
Notice of Allowance dated Jun. 6, 2017, for U.S. Appl. No. 14/981,794 by Rottman, K., et al., filed Dec. 28, 2015.
Notice of Allowance dated Mar. 1, 2017, for U.S. Appl. No. 14/981,769 by Rottmann, K., et al., filed Dec. 28, 2015.
Notice of Allowance dated Nov. 30, 2016, for U.S. Appl. No. 14/302,032 of Herdagdelen, A., filed Jun. 11, 2014.

(56) References Cited

OTHER PUBLICATIONS

Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
Supplemental Notice of Allowability dated Jul. 13, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
Taylor, S. et al. "Forecasting at Scale" Jan. 2017, retrieved from https://facebookincubator.github.io/prophet/static/prophet_paper_20170113.pdf.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/621,921 of Huang, F., filed Feb. 13, 2015.
U.S. Appl. No. 14/861,747 by Huang, F., filed Sep. 22, 2015.
U.S. Appl. No. 14/967,897 of Huang F. et al., filed Dec. 14, 2015.
U.S. Appl. No. 14/973,387, of Rottmann, K., et al., filed Dec. 17, 2015.
U.S. Appl. No. 14/980,654 of Pino, J. et al., filed Dec. 28, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
U.S. Appl. No. 15/275,235 of Huang, F. et al., filed Sep. 23, 2016.
U.S. Appl. No. 15/445,978 by Herdagdelen, A., et al., filed Feb. 28, 2017.
U.S. Appl. No. 15/644,690 of Huang, F. et al., filed Jul. 7, 2017.
U.S. Appl. No. 15/652,144 of Rottmann, K., filed Jul. 17, 2017.
U.S. Appl. No. 15/654,668 of Rottmann, K., filed Jul. 19, 2017.
U.S. Appl. No. 15/672,690 of Huang, F., filed Aug. 9, 2017.
U.S. Appl. No. 15/696,121 of Rottmann, K. et al., filed Sep. 5, 2017.
Vogel, S. et al., "HMM-Based Word Alignment in Statistical Translation." In Proceedings of the 16th Conference on Computational Linguistics-vol. 2, Association for Computational Linguistics, 1996, pp. 836-841.
Zamora, J.D., et al., "Tweets language identification using feature weightings," Proceedings of the Twitter language identification workshop, Sep. 16, 2017, 5 pages.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.

* cited by examiner

PREDICTING FUTURE TRENDING TOPICS

BACKGROUND

Users spend an immense amount of time interacting with content on social media websites. On one popular social media website, for example, over a billion active users spend a total of over ten million hours each month interacting with the website. These users can often produce hundreds of millions of content posts each day. In response to user access, the social media website can select content such as other users' posts, news feeds, event notifications, and advertisements to display to the users. Selecting content items that users are likely to find helpful or relevant increases the chances that users will interact with those content items and that they will return to the website in the future.

Over time, topics discussed on social media fall into and out of favor. Topics that are discussed above a threshold amount, either as a numerical total or relative to other topics, are referred to as "trending." Determining trending topics can be extremely valuable in selecting content items or in convincing advertisers to utilize social media channels to reach potential customers. For example, trending topics can be helpful to inform marketing decisions, to provide recommendations for other users, to predict resource usage, to draw analogies to other similar topics and actions, etc. However, classifying a topic as trending can be difficult. For example, trends that may exist for a segment of social media contributors, such as those who share a particular geographical location, may not be readily apparent from an analysis of general social media posts. Furthermore, performing an in-depth analysis on combinations of the billions of social media posts that are created every month can become computationally intractable. Furthermore, determining topics that are currently trending is often not as useful as predicting topics that will be trending in the future. However, identifying such trending topics as predictions for the future adds another layer of technical complexity that further limits the ability of systems in the prior art to provide useful topic identifications.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
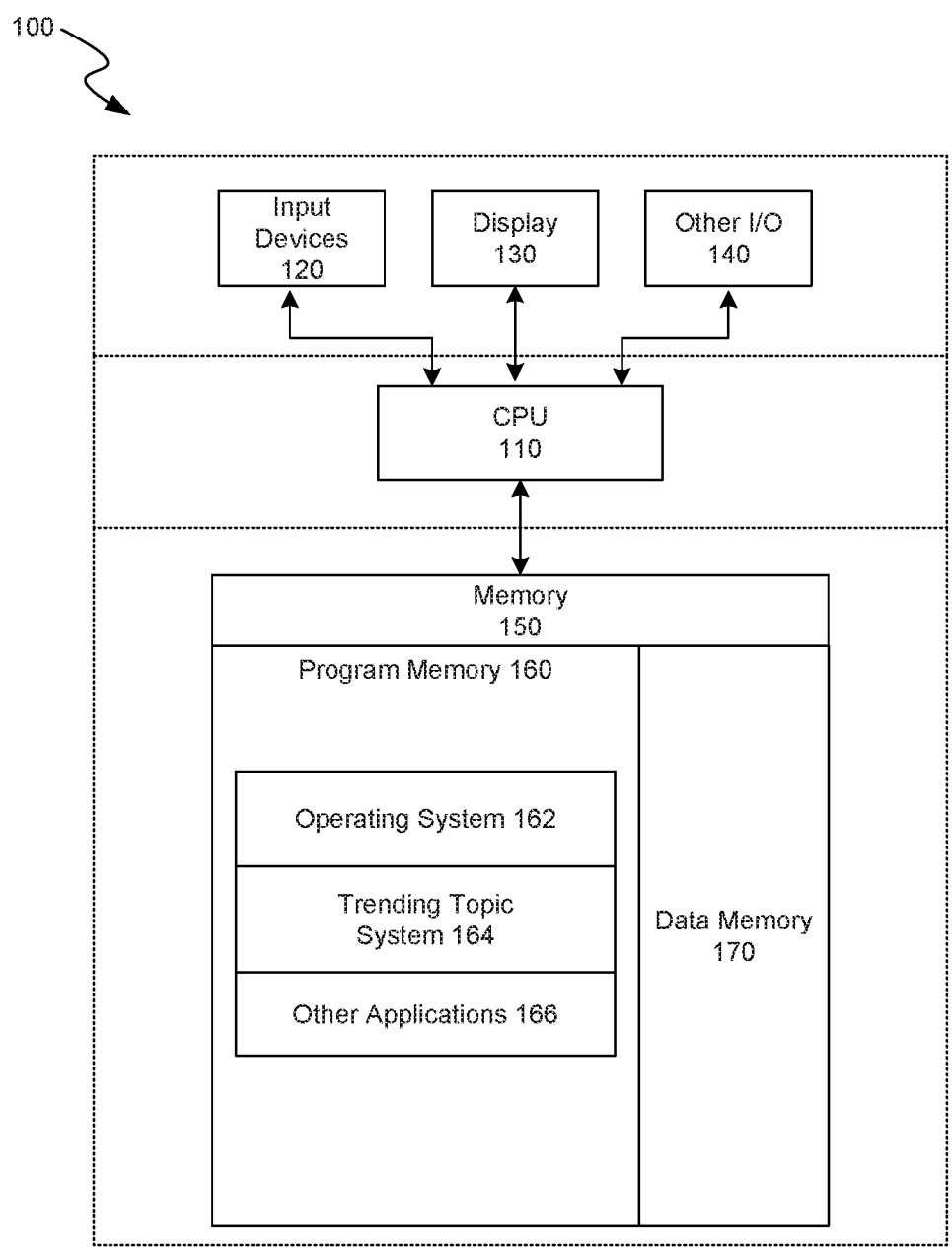
FIG. 1 is a block diagram illustrating an overview of devices on which some implementations can operate.

Embodiments are described for predicting future trending topics by tokenizing posts. A trending topics prediction system can identify topics as a string of one or more words or "n-grams." The trending topics prediction system can identify topics used across billions of posts by extracting text from each post, normalizing and tokenizing the extracted text, and organizing the tokens into n-grams. In some implementations, extracted text can be from both textual content of the post or text extrapolated from associated data, such as using text recognition or automatic labeling on an image or converting audio to text. In various implementations, n-grams can be limited to an exact number of words, e.g. two. The trending topics prediction system can classify source posts by geographical region based on region data for the author of the post or the context of the post creation. The trending topics prediction system can also classify each source post into a vertical. As used herein, a "vertical" can be a subject-based categorization for a post. In some implementations, verticals are defined for a particular purpose such as marketing categories. In some implementations, the trending topics prediction system can classify a post into a vertical by providing the text extracted from the post to a model trained to classify a sequence of text into a vertical, for a defined set of verticals. The trending topics prediction system can have each n-gram, extracted from an originating post, tagged with the originating post's identified region, vertical(s), and a date value associated with the originating post (e.g. a timestamp). The tagged n-grams can be stored in a cumulative set of n-grams.

In some implementations, the trending topics prediction system can eliminate, from the cumulative set, n-grams that contain a "stop word." A defined set of stop words can include any words such as words that appear above a threshold frequency in a language (e.g. the, a, she, etc.), words determined to be offensive, or manually selected words, such as words determined to be unhelpful for determining a trending topic (e.g. "actually," "like," etc.). In some implementations, stop words can also include numbers, while in other implementations n-grams are only removed from the cumulative set if the n-gram has above a threshold amount of numbers. For example, where the n-grams are bi-grams, bi-grams can be left in the cumulative set when they contain zero or one number, but can be removed if both words are a number.

The trending topics prediction system can compute, for each n-gram, a frequency within each category defined by a region/vertical pair. N-grams with a frequency above a threshold for each region/vertical category can be selected. The trending topics prediction system can pass occurrence data, e.g. on a daily scale, for the selected n-grams, to an algorithm to predict a slope of growth (or decline) for the n-gram. In some implementations, this algorithm can fit the occurrence data to a polynomial (e.g. five degree) and identify the slope of the point for the current time. The trending topics prediction system can sort the selected n-grams, within each region/vertical category, by the corresponding computed slopes. The trending topics prediction system can identify n-grams with a comparatively large slope within that region/vertical as likely to be trending in the immediate future.

The technology for predicting future trending topics is described herein as taking data from social media "posts," e.g. any content provided to a social media website such as wall posts, messages between users, comments, shares, events, etc. However, the technology can be used with any other content item source data where text can be extracted from content and tagged with temporal data (e.g. news items, email, television transcripts, etc.) An n-gram can be a sequence of one or more words from a content item.

"Words," as used herein, can be traditional words, i.e. characters separated by whitespace, punctuation, or other special characters, or can be other character groupings, such as a specified amount of characters (which can include numbers). Source content items for n-grams can be any digital data such as text, images, audio, video, links, webpages, minutia (e.g. indicia provided from a client device such as emotion indicators, text snippets, location indictors, etc.), or other multi-media. In some implementations, n-grams can come from metadata associated with a content item such as object, location, or person identifications; image, video, or audio characteristics; structured data provided by an originator of the content item; or any other information associated with the content item. In some implementations, source content items can be social network items or parts of social network items, such as posts, likes, mentions, news items, events, shares, comments, messages, notifications, etc.

In the prior art, determining trends can be a subjective process, particularly for a large data set such as billions of posts, where human users set parameters for source data selection and prediction system models. The technology described herein provides a set of rules that transforms post data into a particular format and applies the rules to deterministically generate a specific result. Namely, the trending topics prediction system extracts text from post data, formats and tokenizes the text, uses occurrence data to configure a polynomial for n-grams within a particular categorization system, and determines a slope of the polynomial. This produces desired results comprising predictions of which topics will be trending in the future. In contrast to the prior art, the present system provides increased reliability of protections and a facility to operate on an extremely large data set (e.g. billions of posts).

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that predicts future trending topics. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, trending topic system 164, and other application programs 166. Memory 150 can also include data memory 170 that can include source content items such as posts, messages, comments, etc.; region data, vertical data, or occurrence data for the source content items; lists of stop words; configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
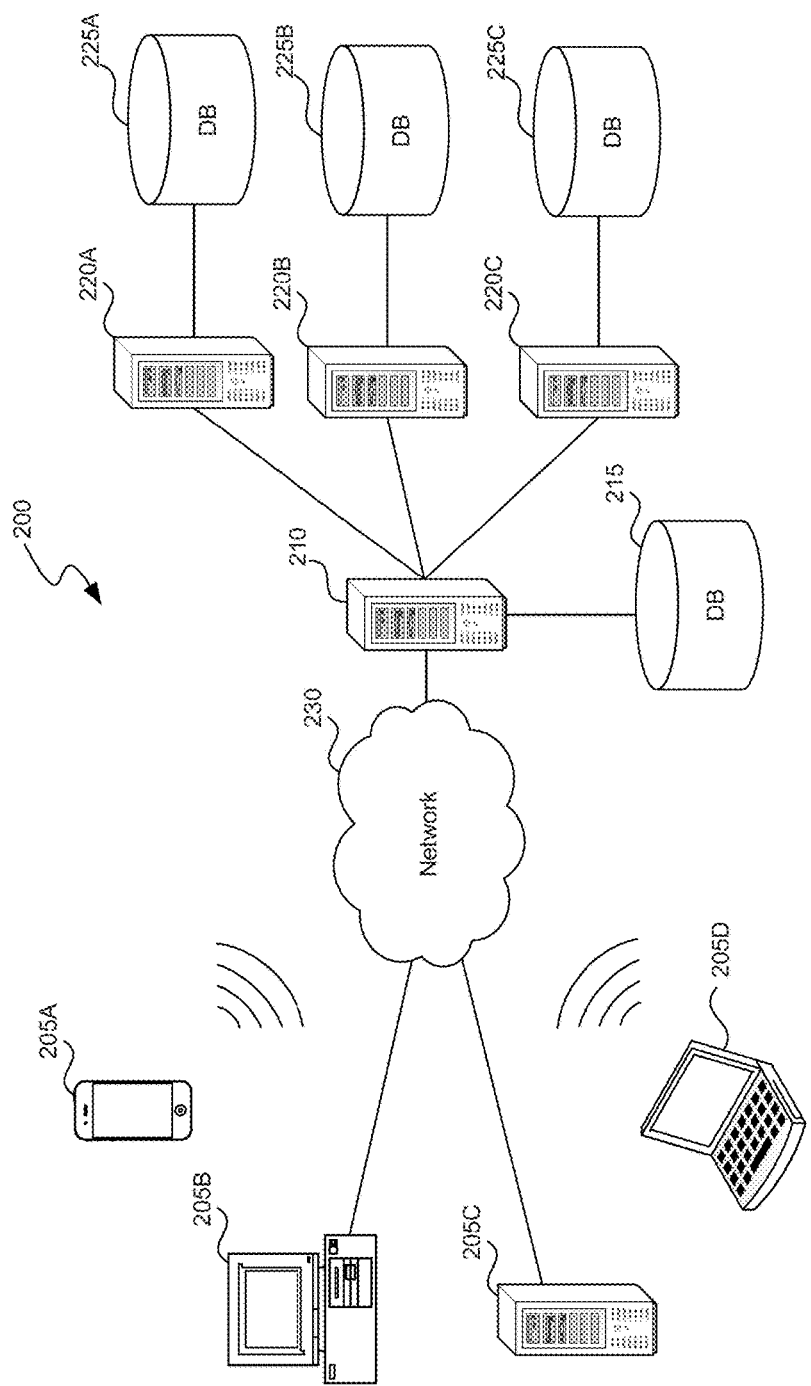
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

In some implementations, servers 210 and 220 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g. indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g. longitude/latitude, country, region, city, etc.), education information, life stage, relationship status, name, a model of devices typically used, languages identified as ones the user is facile with, occupation, contact information, region, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create posts or other content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device or IP geo-mapping) to "check in" to a particular location or identify a particular region, and an edge can connect the user's node with the location's node in the social graph.

A social networking system can provide a variety of communication channels to users. For example, a social networking system can enable a user to email, instant message, or text/SMS message, one or more other users; can enable a user to post a message to the user's wall or profile or another user's wall or profile; can enable a user to post a message to a group or a fan page; can enable a user to comment on an image, wall post or other content item created or uploaded by the user or another user, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, or an instant message external to but originating from the social networking system. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate trending topic selection to predictably select topics in connection with specific social network entities or actions.

Figure 3:
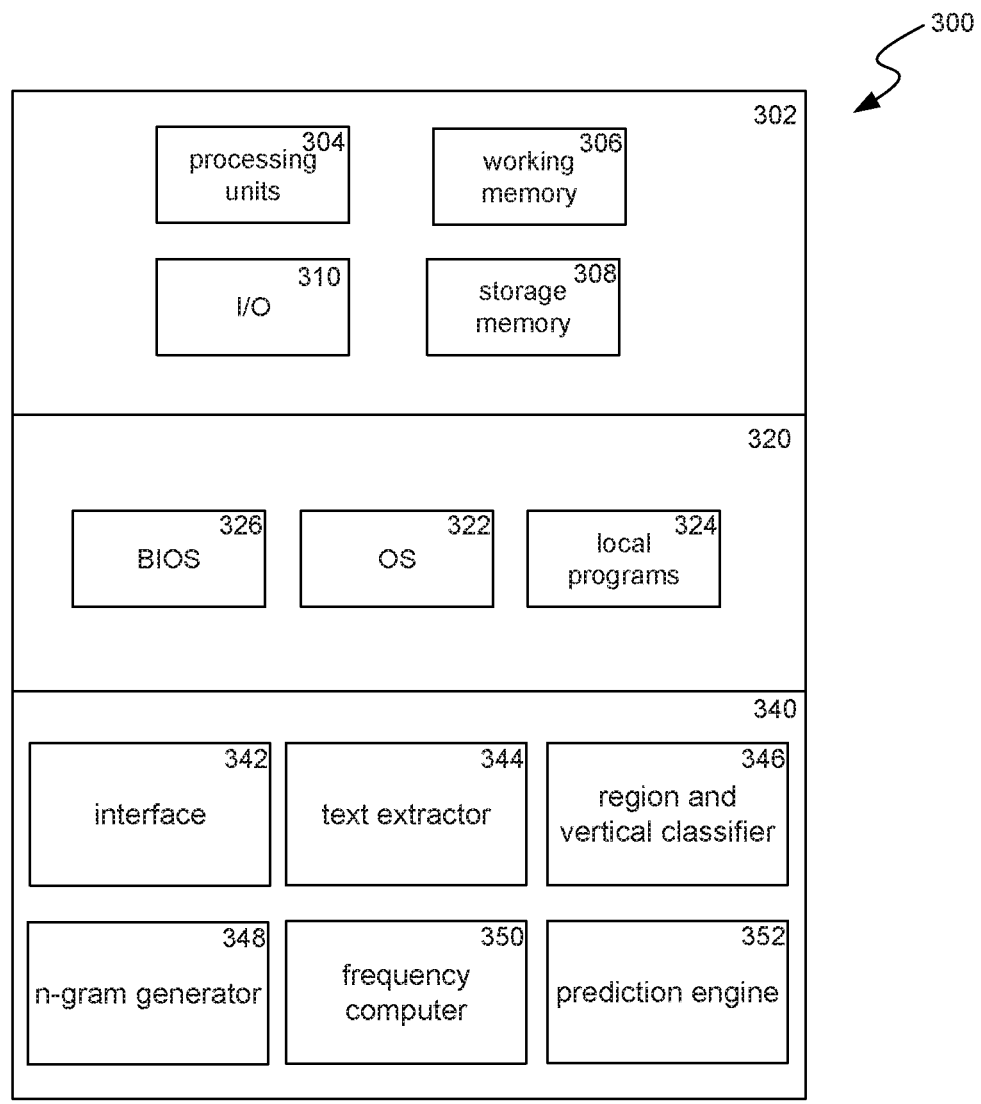
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include text extractor 344, region and vertical classifier 346, n-gram generator 348, frequency computer 350, prediction engine 352, and components which can be used for transferring data and controlling the specialized components, such as interface 342. In some implementations, components 300 can be in a computing system that is distributed across multiple computing devices or can be an interface to a server-based application executing one or more of specialized components 340.

Text extractor 344 can receive, e.g. through interface 342, a set of posts or other content items. Text extractor 344 can extract text from the received set of posts, such as by taking textual content from a post, converting audio associated with the post to text, performing text recognition on a visual element associated with the post, or automatically generating text describing a portion of the post e.g. through subject tagging, automated image or video description systems, etc.

Region and vertical classifier 346 can give each received post a geographical region and a vertical classification. Region and vertical classifier 346 can identify a region classification based on region information for the user that created the post (e.g. language data, zip code, city, state, etc.) or based on region information for a context of the post (e.g. by performing geo-mapping for an IP of the device that originated the post, receiving GPS data from such a device, or receiving region information specified on such a device such as in a browser setting). Region and vertical classifier 346 can identify a vertical category for a post based on the text extracted by text extractor 344, metadata associated with the text such as labels, headings, user supplied tags (e.g. "minutia"), or other contextual data for the post such as where the post was posted and what other content it was associated with. In some implementations, identifying a vertical can be accomplished through natural language processing techniques used on the text extracted from the post. For example, region and vertical classifier 346 can determine a vertical category for a post by supplying the text associated with the post to a classification engine trained to receive a sequence of text and produce a classification from a set of available classifications. In some implementations, the classification engine can be a neural network trained to produce a classification using sequences of text tagged with the vertical classifications (e.g. through manual tagging, word or phrase identification, or other language processing mechanisms).

N-gram generator 348 can normalize the extracted text for each received post, tokenize the normalized text, and organize the tokenized text into n-grams of a particular length. Normalizing the extracted text can include replacing, with whitespace, or removing special characters such as punctuation and emojis. Tokenizing the normalized text can include grouping sets of characters into words, e.g. based on whitespace, punctuation, etc. Organizing the tokenized text into n-grams can include identifying groups of words in a sequence of a particular number of words. In various implementations, the n-grams can be overlapping or nonoverlapping. For example, where the n-gram length is two words, converting the tokens "stay classy San Diego" in a nonoverlapping scenario generate the bi-grams "stay classy" and "San Diego" while in an overlapping scenario, the same series of tokens generate the bi-grams "stay classy," "classy San," and "San Diego." The resulting n-grams can be stored in a cumulative set for all the posts, with each n-gram associated with the region category, vertical category, and date information from the post that originated that n-gram.

In some implementations, n-gram generator 348 can remove from the cumulative set, or not add to the cumulative set, n-grams that contain certain specified stop words. The set of stop words, for example, can be words that appear above a threshold frequency in a language, words determined to be offensive, or manually selected words, such as words determined to be unhelpful for determining a trending topic (e.g. "actually," "like," etc.). In some implementations, stop words can also include numbers, while in other implementations n-grams are only removed from the cumulative set if the n-gram has above a threshold amount of numbers. For example, where the n-grams are tri-grams, tri-grams can be left in the cumulative set when they contain zero or one number, but can be removed if two or more of the three tri-gram words are numbers.

Frequency computer 350 can receive the cumulative set of n-grams, and their associated data, and compute a frequency score for each unique n-gram. A frequency score within a set for a "unique" n-gram is an occurrence value for all n-grams within that set that have the same sequence of tokens. For example, in the set of n-grams "here we go," "we're on our way," "here we go," and "here we go," where the occurrence value is a total count, there are two unique n-grams: "here we go" with an occurrence value of three and "we're on our way" with an occurrence value of one. In some implementations, each n-gram can be grouped under a particular category defined by its region classification, vertical classification, or both. Frequency computer 350 can count, for each unique n-gram, the number of times that unique n-gram occurs total, or occurs within the n-gram's classification group. In some implementations, frequency computer 350 can provide the counts as the frequency score, or can compute the frequency score by dividing the counts by a total, which can be the total of the n-grams within that category or can be the total number of n-grams in the cumulative set. In some implementations, the n-grams can be sorted, or sorted within each category, by their frequency score. N-grams with a frequency above a threshold (i.e. "high frequency n-grams") can be passed to prediction engine 352.

Prediction engine 352 can receive the high frequency n-grams and compute a prediction value as an expectation of how much that n-gram will be trending in the future. In some implementations, this prediction value can be determined by fitting periodic (e.g. daily) occurrence data for the n-gram to a polynomial of a particular degree (e.g. third, fourth, fifth, or sixth degree) and determining the slope of the polynomial corresponding to the current time. In some implementations, prediction engine 352 can utilize the Prophet Forecasting system, described in "Forecasting at Scale" by Sean J. Taylor and Benjamin Letham, January 2017, which is incorporated herein by reference.

In some implementations, the n-grams, or the n-grams within each category, can be sorted according to their computed prediction value. In some implementations, top scoring n-grams (e.g. n-grams with a prediction value above a threshold or above a threshold within their category) can be determined as likely to be trending in the future. Identifications of these top-scoring n-grams can be provided, e.g. through interface 342. For example, advertisers for a product in a particular product vertical may want to know what topics will be trending for their product vertical within a particular region so they can prepare corresponding marketing materials.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
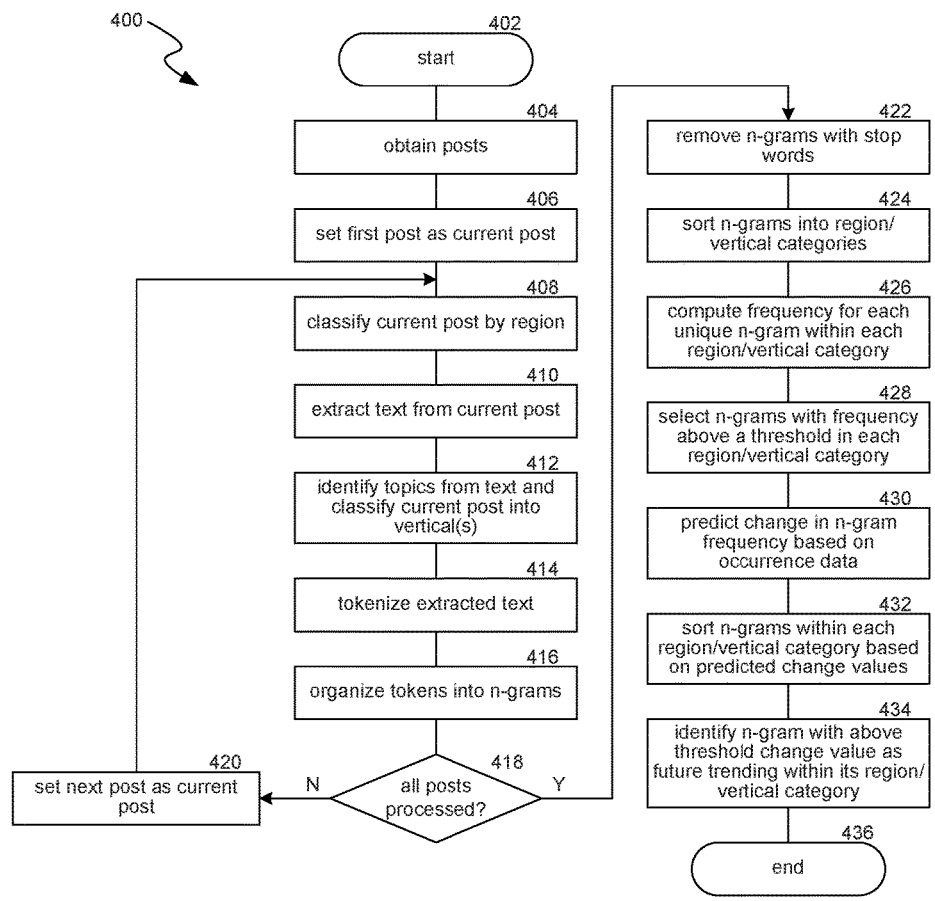
FIG. 4 is a flow diagram illustrating a process used in some implementations for predicting future trending topics.

FIG. 4 is a flow diagram illustrating a process 400 used in some implementations for predicting future trending topics. Process 400 begins at block 402 and continues to block 404.

At block 404, process 400 can obtain a set of content items, e.g. posts. In some implementations, these can be all the posts from a social media website from a particular time period, such as the last six months or the last twelve months.

At block 406, process 400 can set a first post of the obtained posts to be a current post to be operated on by the loop between blocks 408-420. At block 408, process 400 begins this loop by determining a geographical region classification for the current post. This region classification can be based on either or both of characteristics of the user that created the post or the context of the post. For example, a user can be associated with a country, state, city, zip code, or other region indicators, which can be supplied by the user or determined from the user's actions, such as who the user is friends with, where the user logs into a social media website from, what content the user interacts with, etc. As another example, a post can be associated with a context for where the post originated, such as an IP address, GPS data, browser settings, or operating system settings of the device the post originated from. In some implementations, alternatives to a region classification can be used such as post originator age range, education level, identified interests, consumer traits, or other features from a social graph. While the description herein refers to a region classification, in some implementations, these other classification features can be used as a basis for grouping posts.

At block 410, process 400 can extract text from the current post. Extracting text can include using text included as part of the post, converting media associated with the post to text (e.g. audio-to-text or text recognition in images or video), generating descriptions of media associated with a post (e.g. automatic labeling or descriptions of an image), or identifying text associated with a post context (e.g. metadata, associated comments, etc.). In some implementations, extracting the text from a post can include normalizing the text, e.g. removing special characters, emojis, certain punctuation, etc. In some implementations, normalizing can leave characters used for tokenizing at block 414.

At block 412, process 400 can use the text extracted for the current post to identify topics for the current post. Process 400 can use the identified topics to classify the current post into a vertical based on a mapping between topics and verticals. Verticals can be a logical organization of multiple topics that, for a given use, are identified as related. For example, for advertising, verticals can include: cars, shoes, drinks, vacations, etc. Each vertical can map to a set of topics, e.g. cars maps to each of the Toyota, engine, speed, vehicle, etc., topics. Thus, when a post is identified as containing the topic "engine" it can be placed in the cars vertical. In some implementations, a post can be in multiple verticals or can be in the vertical that is most often mapped to by that post's topics. In some implementations, a model can be trained to classify a post for topics and/or verticals. For example, a model can be trained using a set of text sequences, each tagged with a topic or vertical. Model parameters can be adjusted after receiving each training item such that output from the model more closely matches the tag.

At block 414, process 400 can tokenize the text that was extracted from the current post at block 410. Tokenizing can convert a string of characters into a string of words. In some implementations, tokenizing can be performed by grouping sequences of characters between whitespaces, punctuation, or other special characters, by matching sequences of characters to dictionary words, or using a word identification model.

At block 416, process 400 can organize the tokens from block 414 into n-grams of a specified length, such as one, two, or three words. In some implementations, each n-gram can be saved in a cumulative set of n-grams, where each n-gram is associated with the region classification from block 408, the vertical classification from block 412, and a time or date value that the current post was posted.

At block 418, process 400 can determine if all the posts, from the set of posts obtained at block 404, have been processed by the loop between blocks 408-420. If so, process 400 continues to block 422; if not, process 400 continues to block 420. At block 420, process 400 can set the next post, from the set of posts obtained at block 404, as the current post to be operated on by the loop between blocks 408-420.

At block 422, process 400 can remove, from the cumulative set of n-grams, ngrams that include one or more stop words. A defined set of stop words can include any words such as words that appear above a threshold frequency in a language (e.g. the, a, she, etc.), words determined to be offensive, or manually selected words, such as words determined to be unhelpful for determining a trending topic (e.g. "actually," "like," etc.). In some implementations, stop words can also include numbers, while in other implementations n-grams are only removed from the cumulative set if the n-gram has above a threshold amount of numbers. For example, where the n-grams are bi grams, bigrams can be left in the cumulative set when they contain zero or one numbers, but can be removed if both words are a number. In some implementations, instead of adding all ngrams to the cumulative set then removing those with a stop word, process 400 can simply filter n-grams with stop words from being added to the cumulative set at block 416.

At block 424, process 400 can sort the n-grams into groups by the n-gram's associated region classification, vertical classification, or both. At block 426, process 400 can determine, within each group, a frequency value for each unique n-gram. The frequency value can be a total count of the occurrences of the n-gram within the group, or a ratio of this count to either the total number of n-grams or to the n-grams within that group.

At block 428, process 400 can select n-grams whose determined frequency value is above a threshold. This can be a threshold set for all n-grams or a threshold that is relative to each group. For example, only n-grams can be selected that have a frequency value of at least 2000 total occurrences. As another example, only n-grams can be selected whose frequency value is within the top 5% for that n-gram's region and/or vertical group.

At block 430, process 400 can compute a value, for each n-gram selected at block 428, representing a prediction for an amount the n-gram will be trending in the future. In some implementations, this prediction can be computed for a particular n-gram by fitting occurrence data of the particular n-gram over a particular time period (e.g. the past six or twelve months) to a polynomial. In some implementations, this polynomial can be determined by the Prophet Forecasting system discussed above. In some implementations, the value computed for the particular n-gram can be a slope of the polynomial graph at a point for the current time. A positive slope can be a prediction that the use of the n-gram will go up while a negative slope can be a prediction that the use of the n-gram will go down. The magnitude of the slope can predict how drastic this increase or decrease is expected to be.

At block 432, process 400 can sort the n-grams within each region and/or vertical category based on the corresponding prediction values computed at block 430. At block 434, process 400 can identify the n-grams with predicted change values above a threshold. In various implementations, these can be the n-grams with a predicted change value above an overall threshold or above a threshold for the particular region and/or vertical category. For example, process 400 can select the top five n-grams in each category. In some implementations, only n-grams with above a threshold predicted change value are selected. For example, process 400 can select the top five n-grams in each category, as long as each selected n-gram has a predicted change score of at least +0.5. Process 400 then continues to block 436, where it ends.

The n-grams selected at block 434 can be surfaced to users in a variety of ways. For example, a user may want to know what topics will be trending so she can adjust marketing materials in anticipation of the trends. This user can supply a region or vertical and can receive the n-grams identified as future trending for that region/vertical category. The user can then invest early to prepare her marketing materials before the identified topic reaches its peak trending status.

Figure 5:
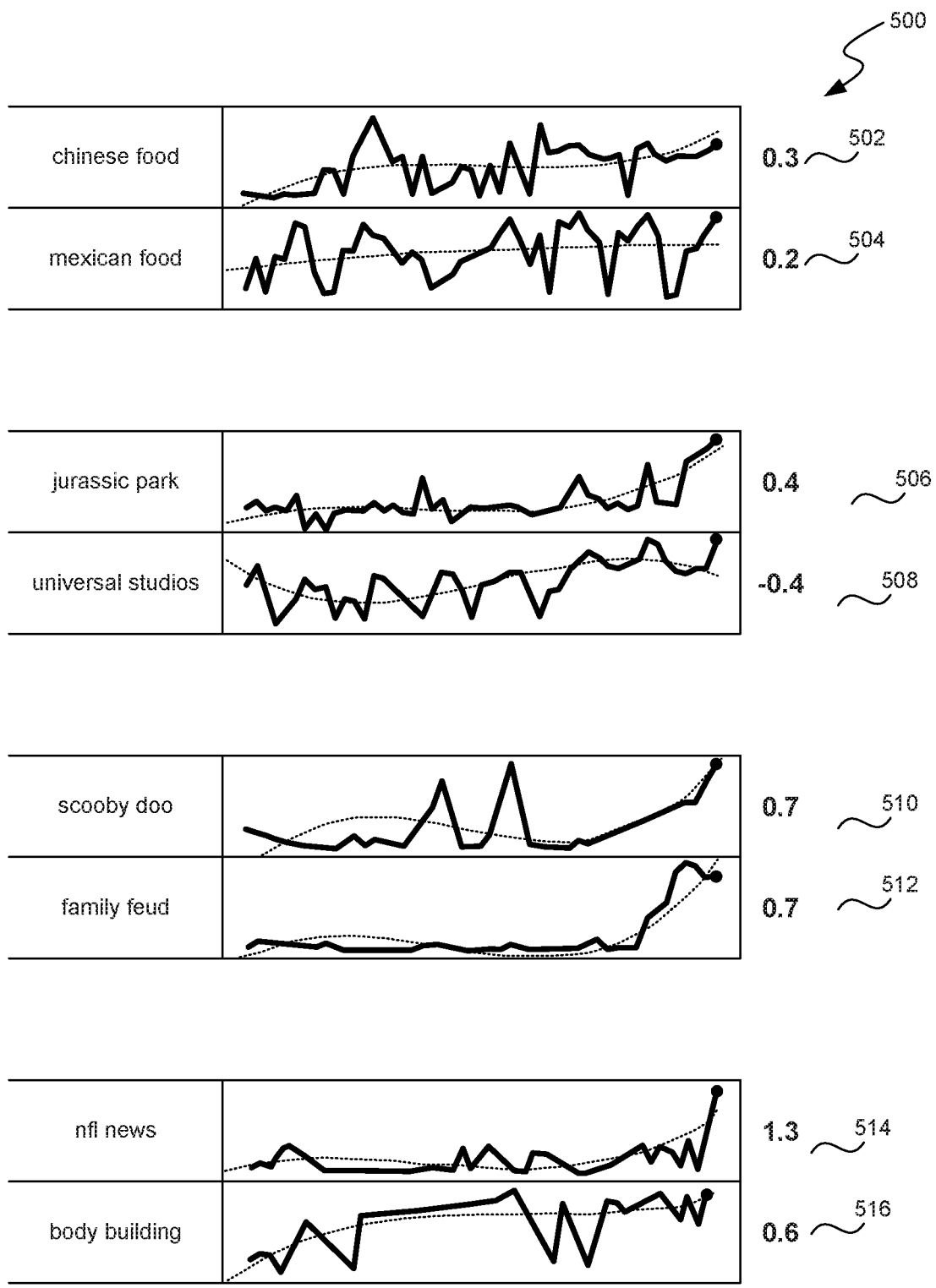
FIG. 5 is a conceptual diagram illustrating sample trending and predicted trending data for topic bi-grams.

FIG. 5 is a conceptual diagram 500 illustrating sample trending and predicted trending data for topic bi-grams. Each pair of bi-grams 502/504, 506/508, 510/512, and 514/516 represent two bi-grams with the same vertical and region classification. The solid line corresponding to each bi-gram represents a total count of that bi-gram, within the vertical/region classification, on a daily basis. The dotted line corresponding to each bi-gram represents a graph of a fifth-degree polynomial that has been fitted to the total count data for that bi-gram. The number corresponding to each bi-gram is the slope of the fifth-degree polynomial for the current time.

Bi-grams 502 and 504 are for bi-grams "chinese food" and "mexican food," which came from posts in a food vertical and that are from users in San Diego, Calif. The slope of the dotted line for the "chinese food" polynomial is 0.3 while the slope of the dotted line for the "mexican food" polynomial is 0.2. This indicates that the topic "chinese food" is predicted to be trending in the immediate future more than the topic "mexican food."

Bi-grams 506 and 508 are for bi-grams "jurassic park" and "universal studios," which came from posts in a movies vertical and that are from users in Austin, Tex. The slope of the dotted line for the "jurassic park" polynomial is 0.4 while the slope of the dotted line for the "universal studios" polynomial is −0.4. This indicates that the topic "jurassic park" is predicted to be trending in the immediate future more than the topic "universal studios." In addition, the slope for "jurassic park" is positive, indicating a predicted increase in the use of this topic, while the slope for "universal studios" is negative, indicating a predicted decrease in the use of this topic.

Bi-grams 510 and 512 are for bi-grams "scooby doo" and "family fued," which came from posts in a television vertical and that are from users in Denver, Colo. The slope of the dotted line for both the "scooby doo" and "family feud" polynomials is 0.7. This indicates that while the most recent data for family feud shows a slight dip, it is predicted that both these topics will increase in trending in the immediate future by the came amount.

Bi-grams 514 and 516 are for bi-grams "nfl news" and "body building," which came from posts in a sports vertical and that are from users in Miami, Fla. The slope of the dotted line for the "nfl news" polynomial is 1.3 while the slope of the dotted line for the "body building" polynomial is 0.6.

This indicates that the topic "nfl news" is predicted to be trending in the immediate future more than the topic "body building."

Figure 6A:
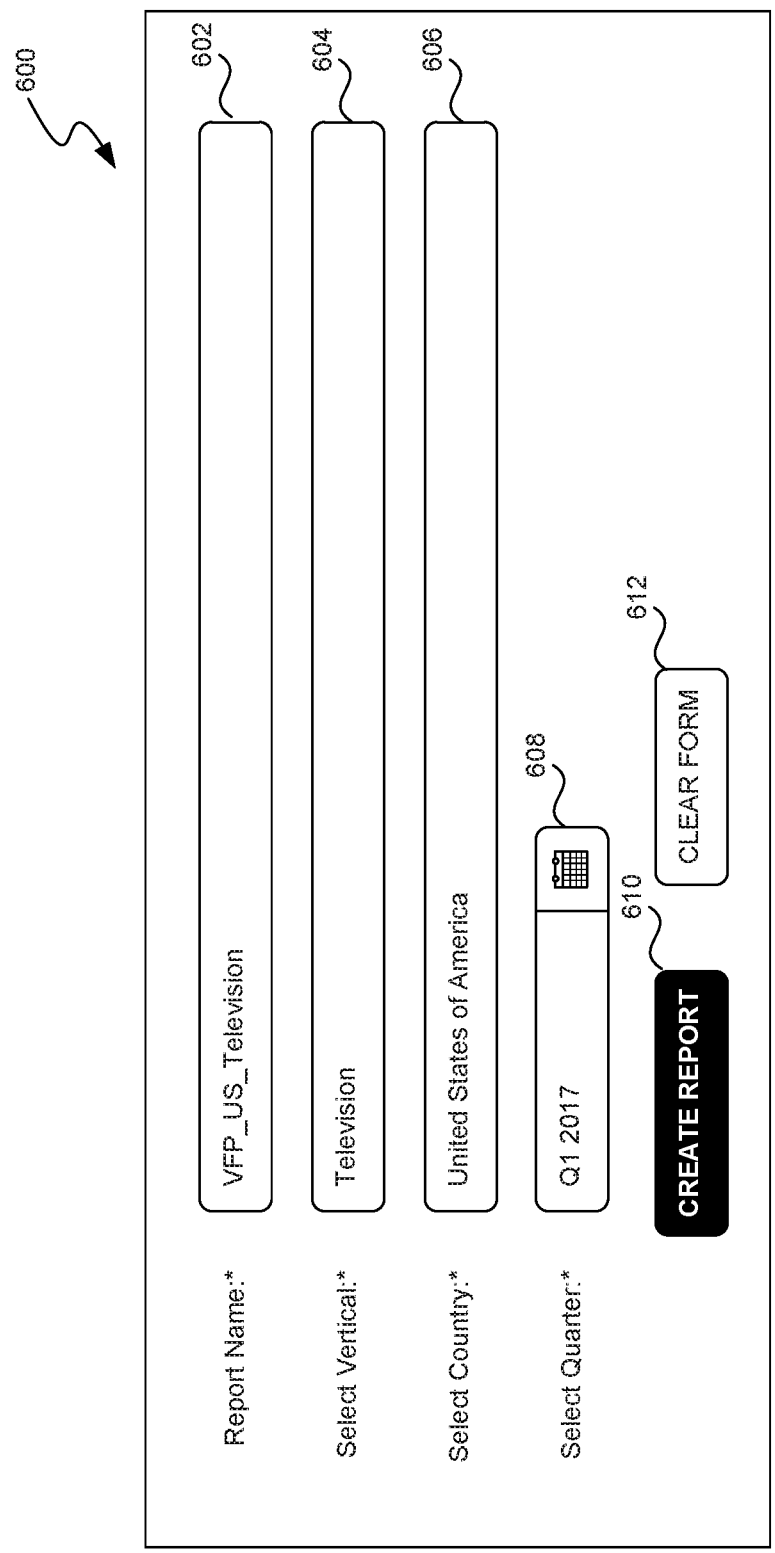
FIGS. 6A and 6B are conceptual diagrams illustrating an example user interface and predicted topic report.

FIG. 6A is a conceptual diagram illustrating an example user interface 600 for retrieving predicted future trending topics by region and/or vertical. User interface 600 includes a field 602 for a user to supply a name for the report they generate, a field 604 for a user to select a vertical category, a field 606 for a user to select a region category (in this case a country), a field 608 for a user to select a timeframe from which to pull source data, a button 610 for a user to instruct a system to create a report with the provided parameters, and a button 612 for a user to reset the user interface 600. Submitting user interface 600 with the parameters shown can cause a computing system to generate a report such as report 650.

Figure 6B:
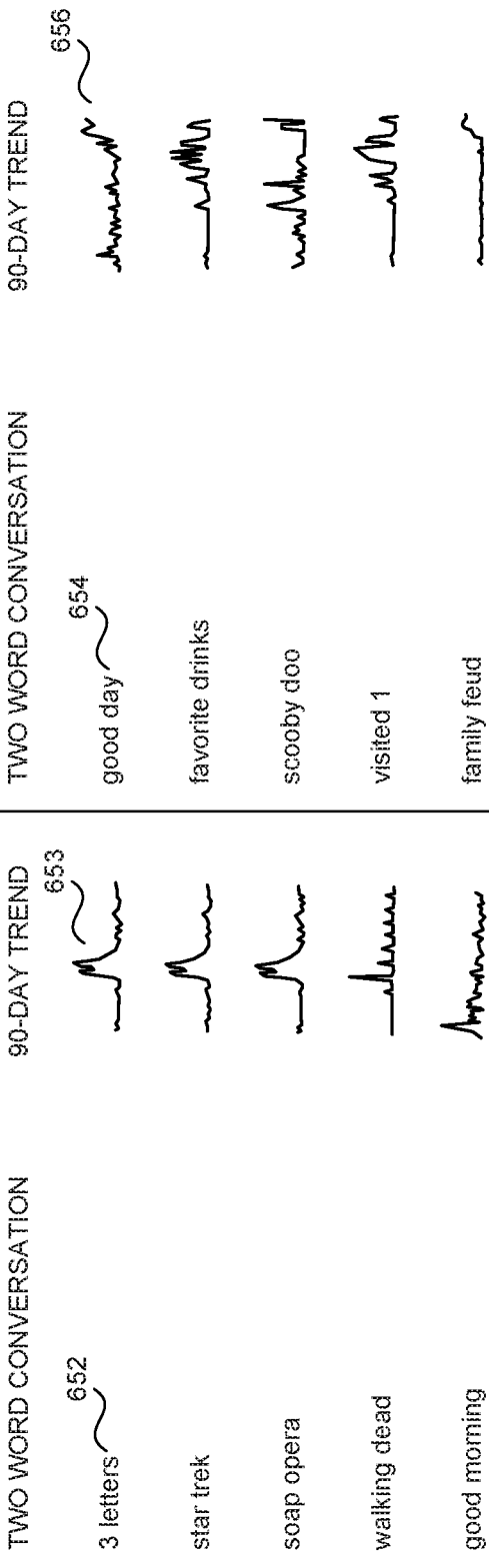

FIG. 6B is a conceptual diagram illustrating an example predicted topic report 650. Report 650 is titled based on the title provided to field 602, the selected categories from fields 604 and 606, and indicates the source data timeframe from field 608. Report 650 includes two columns of results. The first column is "Most Discussed" while the second column is "Growing Conversations." The Most Discussed column is based on a frequency count, in decreasing order, of bi-grams that occurred in posts in the group of posts categorized with both television and U.S. For example, bi-gram 650 "3 letters" is the most common bi-gram in the television/U.S. group of posts. Each of the Most Discussed n-grams is displayed in conjunction with a graph showing the frequency count for that bi-gram over the past 90 days, e.g. bi-gram 652 is associated with graph 653.

The Growing Conversation column lists bi-grams that are determined to be future trending bi-grams, e.g. identified using process 400. The bi-grams listed in the growing conversations column are the five bi-grams from the posts in the television/U.S. group determined to most likely becoming trending in the immediate future, listed from most likely to least likely. The growing conversation bi-grams are selected based a determined slope of a polynomial fit to frequency data for bi-grams. For example, bi-gram 654 "good day" is the bi-gram predicted to be most trending in the immediate future for posts in the television/U.S. group. Each of the Growing Conversation n-grams is displayed in conjunction with a graph showing the frequency count for that bi-gram over the past 90 days, e.g. bi-gram 654 is associated with graph 656. In some implementations, the graph 656, instead of directly showing the frequency data, can be of the polynomial fit to the frequency data.

In some implementations, the n-grams included in report 650 can be used to invest in topics before they reach a peak in how they are trending. For example, at least one of the provided n-grams in the growing conversations column can be used to generate marketing materials prior to those n-grams reaching a peak in trending among users of a social media system.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for identifying future trending n-grams, comprising:
for at least one particular content item of multiple content items:
extracting text from the particular content item;
identifying a plurality of classifications for the particular content item, the plurality of classifications including a geographical region classification and a subject-based classification;
organizing the extracted text into one or more n-grams;
adding the one or more n-grams to a cumulative set of n-grams, wherein each n-gram in the cumulative set is associated with a time-based value for the particular content item;
sorting the n-grams in the cumulative set into groups by the plurality of classifications of the content item that the n-gram originated from;
computing a frequency value, within each group, for each unique n-gram in that group;
selecting unique n-grams, for at least one of the groups, that have a frequency value above a frequency threshold;
computing a predicted change in frequency value for the selected unique n-grams, the computing for a given unique n-gram comprising fitting a polynomial to the time-based values for the n-grams that have the same sequence of words as the given unique n-gram and that are in the same group as the given unique n-gram, wherein the computed predicted change in frequency is a slope of the polynomial at a point corresponding to a current time; and
selecting, as the future trending n-grams, for a geographical region specified in the geographical region classification, one or more n-grams with a predicted change in frequency value above a predicted change threshold.

2. The method of claim 1, wherein the geographical region classification for the content item is identified based on region data for a user who provided the content item or for a device the content item originated from.

3. The method of claim 1, wherein the subject-based classification for the content item is identified based on the extracted text from the particular content item.

4. The method of claim 1, wherein extracting text from the particular content item comprises one or more of:
converting audio associated with the particular content item to text; performing text recognition on an image associated with the particular content item; performing text recognition on video associated with the particular content item.

5. The method of claim 1, wherein organizing the extracted text into one or more n-grams comprises:
normalizing the extracted text;
tokenizing the normalized text; and
grouping the tokenized text into groups of sequential tokens, the groups having a fixed number of tokens.

6. The method of claim 5, wherein the fixed number of tokens is two tokens.

7. The method of claim 5, wherein at least two of the groups of sequential tokens are overlapping in the normalized text.

8. The method of claim 1 further comprising:
identifying at least one invalid n-gram, wherein each particular invalid n-gram is identified as invalid based on an amount of words, of the particular invalid n-gram that match words on a pre-defined stop word list, being above a stop-word threshold; and
removing from the cumulative set the identified invalid n-grams.

9. A non-transitory computer-readable storage medium storing instructions that, when executed by a computing system, cause the computing system to perform operations for identifying one or more future trending n-grams, the operations comprising:
for at least one particular content item of multiple content items:
identifying a plurality of classifications for the particular content item, the plurality of classifications includes a geographical region classification and a subject-based classification;
organizing text associated with the particular content item into one or more n-grams;
adding, from the one or more n-grams into to a cumulative set of n-grams, at least one n-gram;
computing a frequency value for each unique n-gram in the cumulative set of n-grams, the frequency value computed for a frequency within the group of n-grams in the cumulative set of n-grams that have the same one or more classifications;
computing a predicted change in frequency value for at least some of the unique n-grams, the computing for a given n-gram comprising fitting a polynomial to time-based values associated with the n-grams in the cumulative set that have the same sequence of words as the given unique n-gram and that have the same one or more classifications as the given unique n-gram, wherein the computed change in frequency is a slope of the polynomial at a point corresponding to a current time; and
selecting, as the future trending n-grams, for a geographical region specified in the geographical region classification, one or more n-grams with a predicted change in frequency value above a predicted change threshold.

10. The non-transitory computer-readable storage medium of claim 9, wherein at least one of the one or more classifications for each particular content item is identified by performing natural language topic recognition on the text associated with the particular content item.

11. The non-transitory computer-readable storage medium of claim 9, wherein the operations further comprise:
receiving an indication of user input choosing a selected geographical region and a selected subject; and
in response to the indication of user input, providing a subset of the selected future trending n-grams whose one or more classifications include both the region classification matching the selected geographical region and the subject-based classification matching the selected subject.

12. The non-transitory computer-readable storage medium of claim 11, wherein at least one chosen n-gram of the provided subset of future trending n-grams is used to generate marketing materials prior to the chosen n-gram reaching a peak in trending among users of a social media system.

13. The non-transitory computer-readable storage medium of claim 9, wherein the operations further comprise selecting the at least some of the unique n-grams to be used in predicting a change frequency by:

selecting unique n-grams, for at least one of the groups, that have a frequency value above a frequency threshold.

14. The non-transitory computer-readable storage medium of claim 9, wherein the geographical region classification for the content item is identified based on region data for a user who provided the content item or for a device the content item originated from.

15. The non-transitory computer-readable storage medium of claim 9, wherein the subject based classification of the content item is identified based on text associated with the particular content item.

16. The non-transitory computer-readable storage medium of claim 9, wherein the operations further comprise extracting text from each particular content item, extracting the text from each particular content item including one or more of:
  converting audio associated with the particular content item to text;
  performing text recognition on an image associated with the particular content item; or
  performing text recognition on video associated with the particular content item.

17. The non-transitory computer-readable storage medium of claim 16, wherein organizing the text into one or more n-grams comprises:
  normalizing the text;
  tokenizing the normalized text; and
  grouping the tokenized text into groups of sequential tokens, the groups having a fixed number of tokens.

18. The non-transitory computer-readable storage medium of claim 9, wherein the operations further comprise:
  identifying at least one invalid n-gram, wherein each particular invalid n-gram is identified as invalid based on an amount of words, of the particular invalid n-gram that match words on a pre-defined stop word list, being above a stop-word threshold; and
  removing from the cumulative set the identified invalid n-grams.

* * * * *